United States Patent [19]

Patrick et al.

[11] Patent Number: 5,235,855
[45] Date of Patent: Aug. 17, 1993

[54] ROD POSITIONING APPARATUS

[75] Inventors: Stanley S. Patrick; Ernest R. Lacy, both of Columbia, S.C.

[73] Assignee: Westinghouse Electric Corp., Pittsburgh, Pa.

[21] Appl. No.: 674,236

[22] Filed: Mar. 25, 1991

[51] Int. Cl.⁵ .................. G01N 29/04; G01N 29/22
[52] U.S. Cl. ........................ 73/622; 73/627;
  73/644; 73/634; 414/745.1; 29/33 T; 29/906;
  356/375; 250/222.1
[58] Field of Search .................. 29/33 T, 906;
  414/745.1, 745.7, 746.3, 749; 73/618, 619, 620,
  621, 622, 627, 644, 634; 376/250, 251, 252, 258,
  245; 356/375; 250/222.1

[56] References Cited

U.S. PATENT DOCUMENTS

| | | | |
|---|---|---|---|
| 3,656,855 | 4/1972 | Collart et al. | 356/375 |
| 4,286,880 | 9/1981 | Young | 356/375 |
| 4,304,630 | 12/1981 | Tanner | 376/258 |
| 4,464,332 | 8/1984 | Boisseuil et al. | 356/375 |
| 4,554,128 | 11/1985 | Parker et al. | 376/252 |
| 4,720,369 | 1/1988 | Cadaureille et al. | 376/248 |
| 4,741,878 | 5/1988 | Gebelin et al. | 376/248 |
| 4,764,334 | 8/1988 | King et al. | 376/248 |
| 5,063,779 | 11/1991 | Landry et al. | 73/622 |

FOREIGN PATENT DOCUMENTS 0091503 3/1990 Japan ...................... 356/375

*Primary Examiner*—Hezron E. Williams
*Assistant Examiner*—Rose M. Finley

[57] ABSTRACT

A rod positioning apparatus is disclosed for positioning the end of a rod for a subsequent work operation on the rod such as ultrasonic testing of the rod end. A rod stop member receives the end of a rod advanced into a rod working position. A light emitting diode emits light through a fiber optic cable and across the area a rod end occupies when positioned in a rod stop position of the rod stop member. The end of a fiber optic cable receives light emitted across the rod stop position and directs the light to a light sensor. A control is activated when the light is not sensed on the light sensor and is activated for controlling a rod advancing and securing mechanism for stopping further advancement of the rod and securing the rod in a fixed position when the rod has advanced into the rod stop position and blocked light emitted from the light emitting diode through the fiber optic cables and onto the light sensor.

5 Claims, 4 Drawing Sheets

ROD POSITIONING APPARATUS

FIELD OF THE INVENTION

This invention relates generally to an apparatus for positioning the end of a rod for a work operation on the rod end such as ultrasonic testing.

BACKGROUND OF THE INVENTION

In the process of manufacturing a nuclear fuel rod, a sealing plug is inserted into one end of an open-ended fuel tube. The nuclear fuel pellets then are inserted into the other, unsealed open end of the fuel tube. The open end of the fuel tube is plugged with a sealing plug having an orifice extending axially therethrough and communicating with the interior of the tube. The sealing plug is girth welded to the tube by welding around the outer circumference of the tube while concurrently evacuating the tube of gases produced during the girth welding process by drawing air outward through the axial opening in the sealing plug. After girth welding, the tube is pressurized by injecting inert gas through the axial opening into the tube. The axial opening then is seal-welded closed, thus forming a complete nuclear fuel rod.

Nuclear fuel rods typically are ultrasonically tested to detect flaws in the seal and girth welds. In the ultrasonic testing process, a nuclear fuel rod is advanced into a water tank and the end of the fuel rod is positioned against a rod stop member for precisely positioning the end of the fuel rod in the water tank. The ultrasonic testing equipment normally uses ultrasonic testing transducers for emitting sound waves. The transducers are highly sensitive and the end of the fuel rod must be precisely positioned in the water tank so that the transducers are positioned adjacent the end of the fuel rod and will emit sound waves directly onto the weld. Repetitive positioning of the fuel rods is important because the transducers are precisely positioned for emitting sound waves at a particular location.

Typically, repetitive positioning of fuel rods to within distances as little as 0.001 inch is necessary to assure that the seal welds of successive rods which are inserted into the water tank for testing will be properly ultrasonically tested. Positioning of the fuel rod for seal weld testing is critical because the seal weld is typically no more than 0.015 inches deep. That low weld depth requires precise positioning of the fuel rod to obtain adequate ultrasonic testing of the seal weld. The seal and girth welds are tested concurrently as the fuel rod is rotated and axially moved within the test tank. Positioning of the girth weld is not as important because as the fuel rod is advanced, it can be ultrasonically tested throughout the distance the fuel rod moves.

In a prior art rod positioning apparatus for use with ultrasonic testing of rods such as fuel rods, the fuel rod is moved into engagement with a rod stop member for positioning the end of a nuclear fuel rod for ultrasonic testing. In this prior art apparatus, the rod stop member includes an electrical contact sensor for sensing the end of the rod as it moves into a rod stop position on the rod stop member. The electrical contact sensor is connected by electrical wire leads to a controller which stops the fuel rod advancement and fixes the fuel rod in a rod testing position after the end of the fuel rod makes contact with the electrical sensor. After the rod is positioned, the rod stop member is lowered for allowing ultrasonic testing.

The apparatus as described does not provide for reliable repetitive positioning of successively advanced fuel rods. Because the electrical contact sensor is positioned in a water bath on the rod stop member, the water may affect adversely the reliability and operability of the sensor. Additionally, the water tends to corrode the electrical leads supplying current to the electrical contact sensor thus making operation of the apparatus unreliable.

The above prior art apparatus also does not provide for orienting a rod which is guided in an undesired orientation to the rod stop member. At times, a fuel rod is advanced into the water tank at an undesired orientation. Unless the fuel rod is oriented properly, the testing is not reliable. In this prior art apparatus, the rod stop member cannot orient a rod axially for proper positioning and ultrasonic testing. If the rod is advanced in a skewed direction relative to the rod stop member and the end of the fuel rod contacts the electrical contact sensor, the rod is locked into an undesired position.

SUMMARY OF THE INVENTION

The present invention provides for an apparatus for positioning the end of a rod for subsequent work operations on the rod end where positioning of a rod is critical such as under water ultrasonic testing. The apparatus does not use an electrical contact sensor for sensing the position of the end of a rod. Additionally, the rod stop member is formed for engaging a misaligned rod end and for guiding the rod end into alignment into a rod stop position.

In accordance with the present invention, the apparatus for positioning the end of a rod for testing advantageously includes means for axially advancing a rod along a path of travel toward a testing position. The advancing means includes rod securing means for securing the rod end in a fixed position when the rod end has advanced into the testing position. A rod stop member receives the end of a rod advanced into the testing position. The rod stop member includes means defining the testing position, which comprises a light emittance means and a light sensor means.

The light emittance means emits light across the area a rod end occupies when positioned in the testing position. The light sensor means is positioned for receiving the light emitted by the light emittance means. Control means operatively connects to the rod advancing and securing means for stopping advancement of the rod and securing the rod in a fixed position. The control means is operatively connected to the rod advancing and securing means and to the light sensor means and is responsive to the light sensor means for stopping further advancement of the rod and securing the rod in a fixed position when the rod end has advanced into the testing position and blocked the light emitted from the light emittance means onto the light sensor means.

The light emittance means advantageously comprises a light emitting diode and a fiber optic cable having one end connected to the light emitting diode for receiving the emitted light from the diode and the other end supported by the rod stop member adjacent to the testing position and being positioned for emitting light across the testing position. The light sensor means comprises a light detecting diode and a fiber optic cable having one end connected to the light detecting diode and the other end supported by the testing adjacent the rod stop position for receiving light emitted from the light emitting diode.

The rod stop member advantageously comprises a substantially horizontal top surface on the rod stop member for engaging the rod end as it is advanced into the testing position. The top surface includes an inclined concave groove for engaging a misaligned rod end for guiding the rod end into alignment with the testing position.

The rod stop member is supported for movement between a first position for receiving a rod into the testing position, and a second position withdrawn from the testing position for allowing a subsequent working operation on the rod. Drive means interconnects the rod stop member for moving the member between the first and second positions and advantageously comprises an air cylinder for raising the rod stop member into the testing position and lowering the rod stop member out of the testing position.

DESCRIPTION OF THE DRAWINGS

The advantages of the present invention having been stated, other advantages will become apparent in association with the following drawings in which.

DETAILED DESCRIPTION OF THE INVENTION

Figure 1:
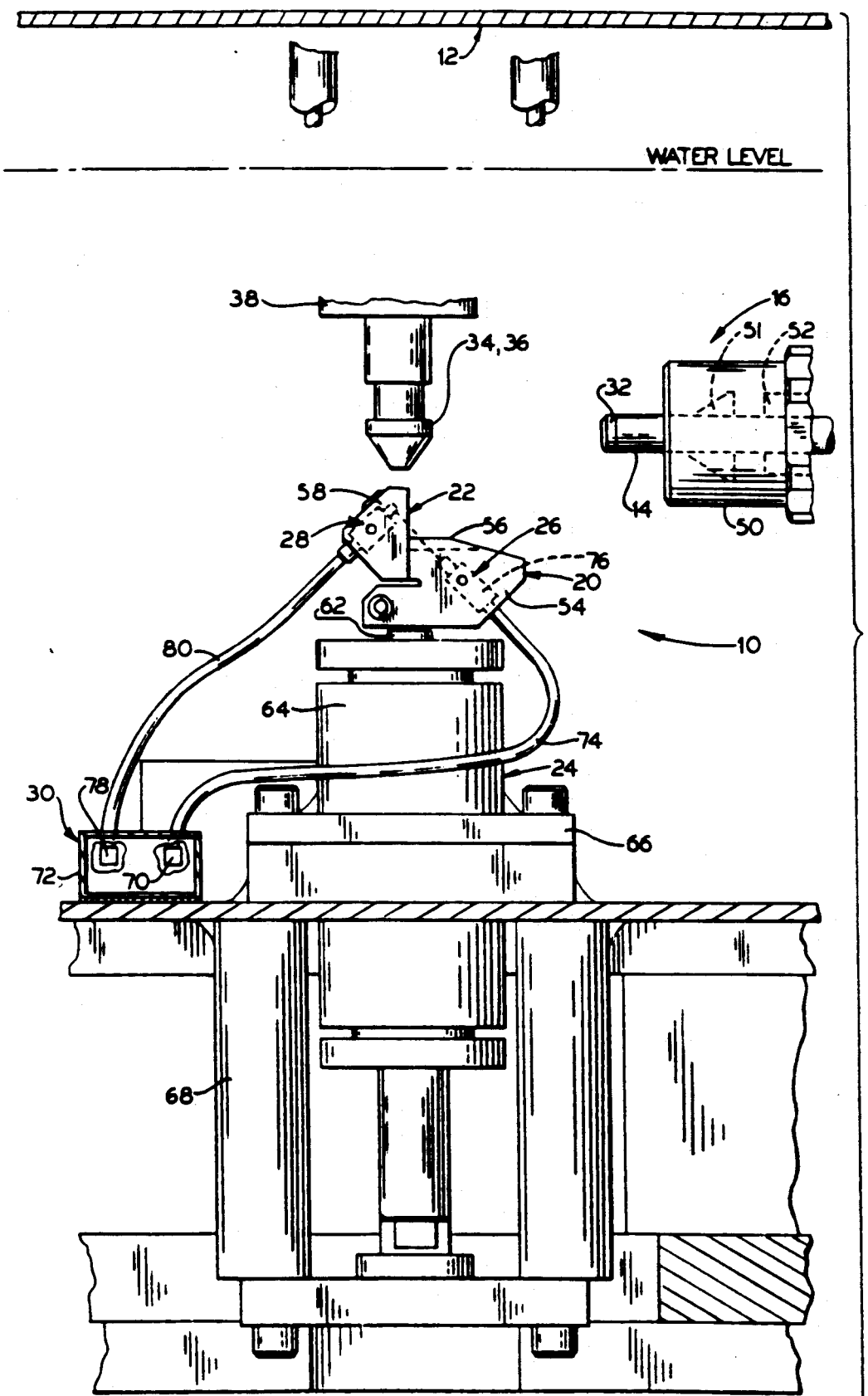
FIG. 1 is a side elevational view of the rod positioning apparatus in accordance with one embodiment of the present invention and showing the rod stop member positioned in a water tank for ultrasonic testing of the end of the fuel rod.

Referring now to the drawings, there is illustrated generally at 10 an apparatus for positioning the end of a rod for work operations on the rod, such as ultrasonic testing. In the illustrated embodiment, the positioning apparatus 10 is used in a water tank 12 for allowing ultrasonic testing of the end of a nuclear fuel rod 14. Although the description as follows will refer particularly to the positioning apparatus as used for positioning the end of a nuclear fuel rod for ultrasonic testing of the seal and girth welds securing the sealing plug to the end of a fuel tube, the positioning apparatus 10 can be used for positioning the end of a rod in a rod working position for subsequent work operations on the rod such as ultrasonic testing, inspecting, forming or welding.

As shown in FIG. 1, the positioning apparatus 10 generally includes means indicated at 16, for advancing a rod into a testing position, and securing the rod end into a fixed position when the rod end has advanced into the testing position. A rod stop member, indicated generally at 20, receives the end of a rod advanced into the testing position. The testing position in the illustrated embodiment comprises a testing area where ultrasonic testing of the fuel rod can occur.

The rod stop member 20 includes means defining a testing position indicated generally at 22 in which the rod end is received for positioning the rod end for testing. The rod stop member 20 is movable between a first position (FIG. 5) where the rod stop member is positioned in a rod testing position for receiving the rod into the testing position, and a second position (FIG. 6) where the rod stop member 20 is positioned out of the rod testing position for allowing ultrasonic testing on the end of the rod. Drive means indicated generally at 24 is connected to the rod stop member for moving the rod stop member between first and second positions.

The means 22 defining a testing position includes light emittance means, indicated generally at 26, which emits light across the area a rod end occupies when positioned in the rod stop position. Light sensor means, indicated generally at 28, receives the emitted light across from the testing position and opposite the light emittance means 26. Control means 30 is operatively connected to the rod advancing and securing means 16 and to the light sensing means 28 and is responsive to the light sensing means when light is not sensed for controlling the rod advancing and securing means. The control means 30 stops further advancement of the fuel rod 14 and secures the fuel rod in a fixed position when the fuel rod end has advanced into the testing position and blocked the light emitted from the light emittance means 26 onto the light sensing means 28.

Figures 2, 2A:
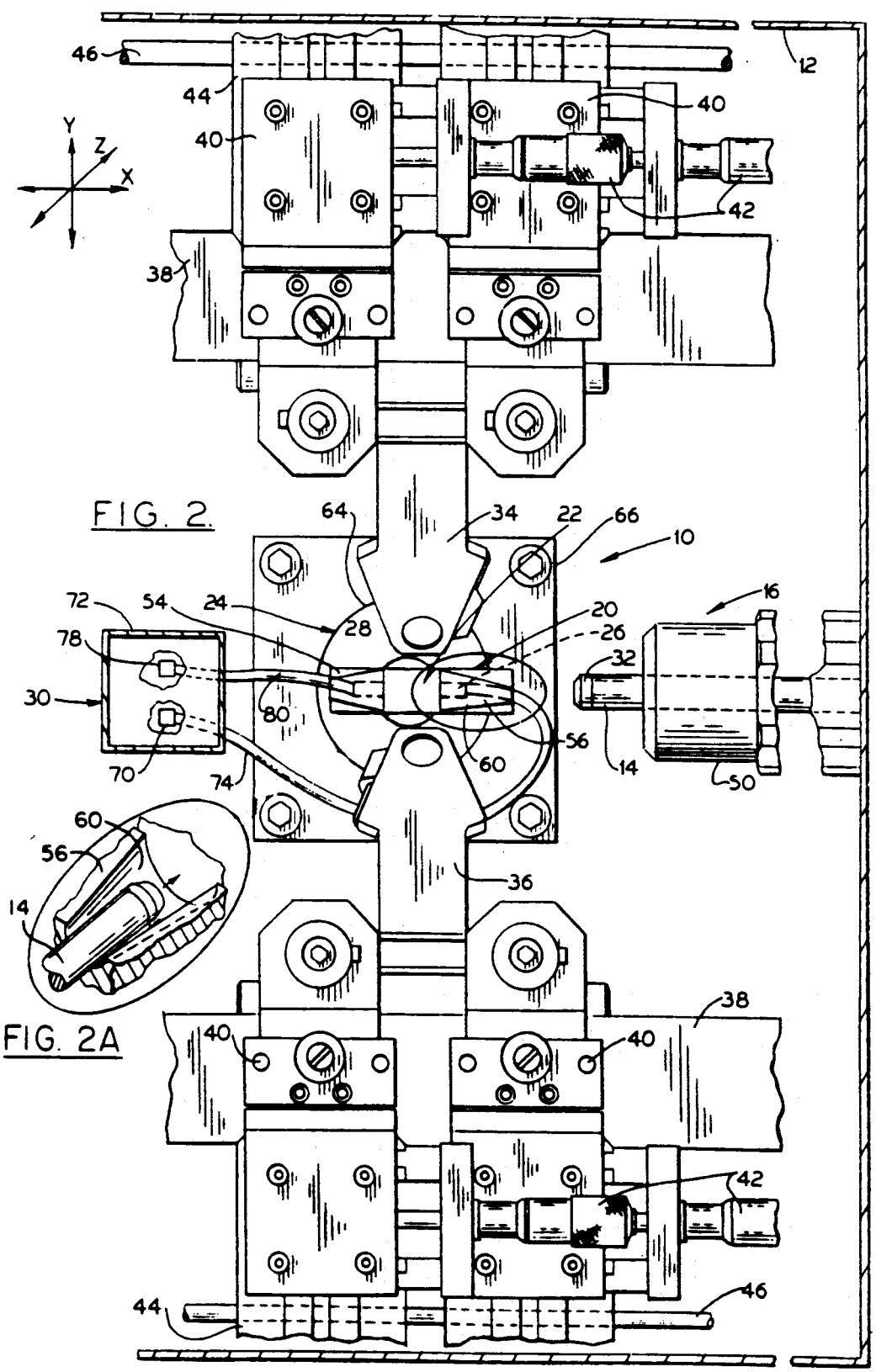
FIG. 2 is a plan view of the rod positioning apparatus of FIG. 1 and showing ultrasonic transducers positioned adjacent the rod positioning apparatus.
FIG. 2A is an enlarged, schematic illustration of the inclined concave groove which forms a portion of the rod positioning apparatus of FIG. 1 and is used to guide misaligned rods into the rod working position.
Figure 3:
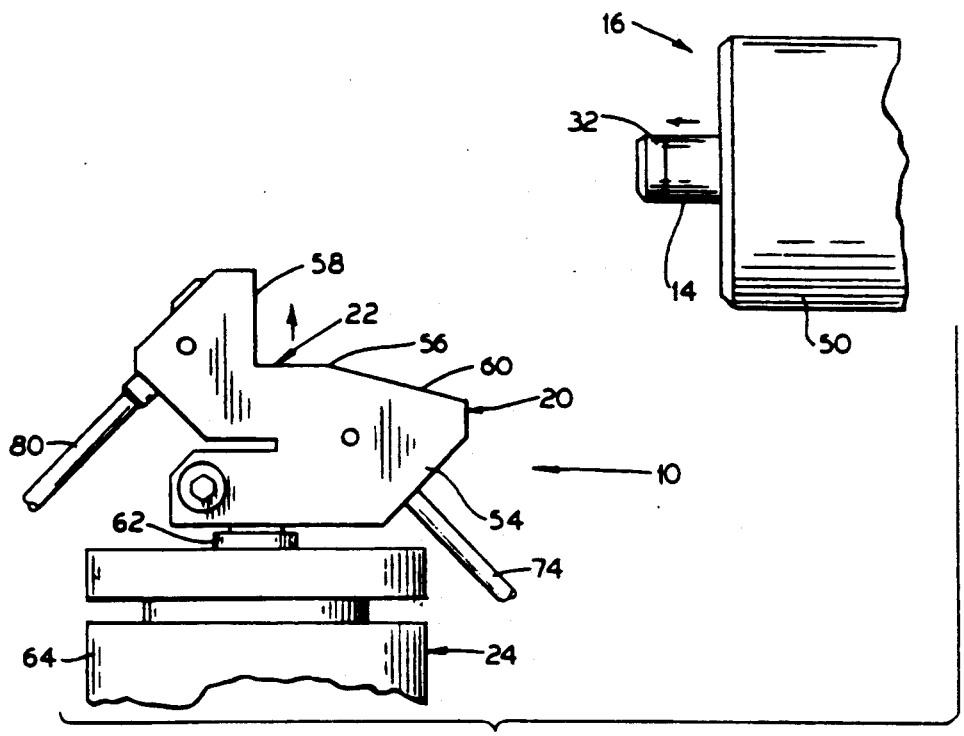
FIG. 3 is a schematic elevation view showing the rod positioning apparatus and an advancing fuel rod.
Figure 4:
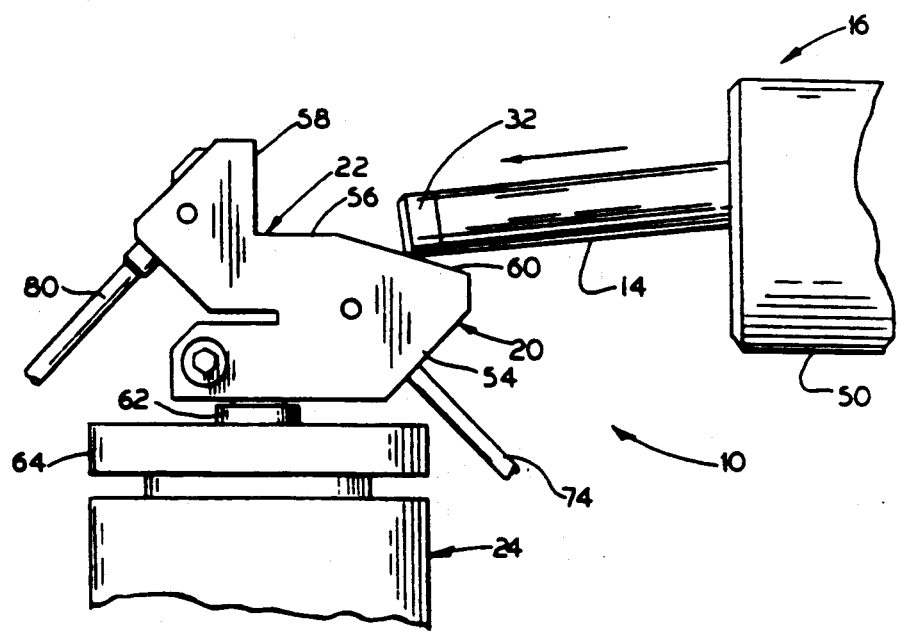
FIG. 4 is a schematic elevation view similar to FIG. 3 and showing by exaggeration a misaligned fuel rod advancing into the inclined concave groove for engaging a misaligned rod end and guiding the rod end into alignment in the rod stop position.

As shown in greater detail in FIG. 2 and 2A, the rod stop member 20 is positioned in the water tank 12 of a conventional ultrasonic testing apparatus. Ultrasonic testing of the seal and girth welds is considered an advantageous nondestructive testing method for testing the seal and girth welds of nuclear fuel rods 14. The seal and girth welds are formed after fuel pellets have been inserted into the open end of a fuel tube. The fuel tube then is plugged with a sealing plug 32 having an orifice extending axially therethrough and communicating with the interior of the tube. The sealing plug is girth welded to the tube by welding around the outer circumference of the tube while concurrently evacuating the tube of gases produced during the girth welding process by drawing air outward through the axial opening in the sealing plug. After girth welding, the tube is pressurized by injecting air through the axial opening into the tube. The axial opening then is seal welded closed thus forming a completed nuclear fuel rod.

Generally, ultrasonic testing involves beams of high-frequency sound waves introduced into the fuel rod to detect flaws and evaluate the properties of the sealing plug, fuel tube and the weld portion interconnecting the sealing plug and fuel tube. The sound waves are generated by a transducer, which converts electrical pulses into the sound waves. The sound waves travel through the end portion of the fuel rod and are reflected back by a material discontinuity to the transducer. This reflected beam is detected and analyzed to define the presence and location of flaws. The pulse-echo method predominately is used where individual pulses of sound with high frequency and short duration are sent into the end of the fuel rod. The transducer typically consists of a piezoelectric element that transforms the electric pulses into high frequency sound and then receives the sound waves to transform them back to electric pulses. The resident frequency of the transducer typically can range between 100 Khz and 100 Mhz. In the illustrated embodiment, two transducers 34, 36 are used. One could be used; however, two transducers have been found more reliable.

The transducers 34, 36 are connected to a bridge-manipulator 38 mounted on the side of the ultrasonic testing water tank 12. The transducers 34, 36 are fixed to mounting blocks 40 mounted on the bridge-manipulator unit 38 by means such as a dovetail slide channel (not shown). The mounting blocks 40 are movable in the sliding channels in the X-Y-Z direction for allowing critical positioning of the transducers 34, 36 relative to the rod stop member 20 positioned in the water tank 12. Micrometer adjustment members 42 are connected to the mounting blocks to assure positioning within distances as small as 0.001 inches.

The bridge-manipulator unit 38 includes a carriage unit 44 at each end of the bridge-manipulator. Each carriage unit 44 is mounted on side guide rods 46 to facilitate movement of the bridge-manipulator 38 along the length of the water tank side walls. The water tank 12 walls typically are at least 10 to 15 inches high for allowing an adequate water depth for ultrasonic testing. The water in the tank preferably is clean, de-aerated water containing a wetting agent. Typically the water is maintained at approximately 70° F. (21° C.) by automatic controls.

Figure 5:
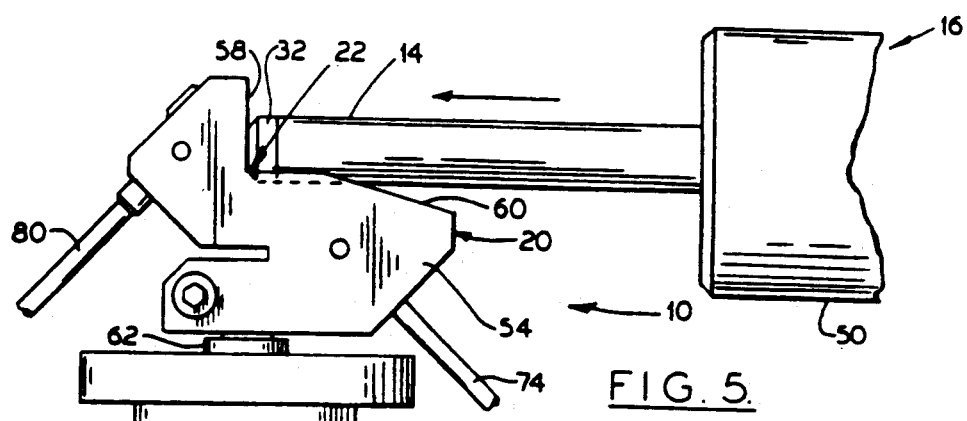
FIG. 5 is a schematic elevational view showing a fuel rod positioned in the rod stop position on the rod stop member.
Figure 6:
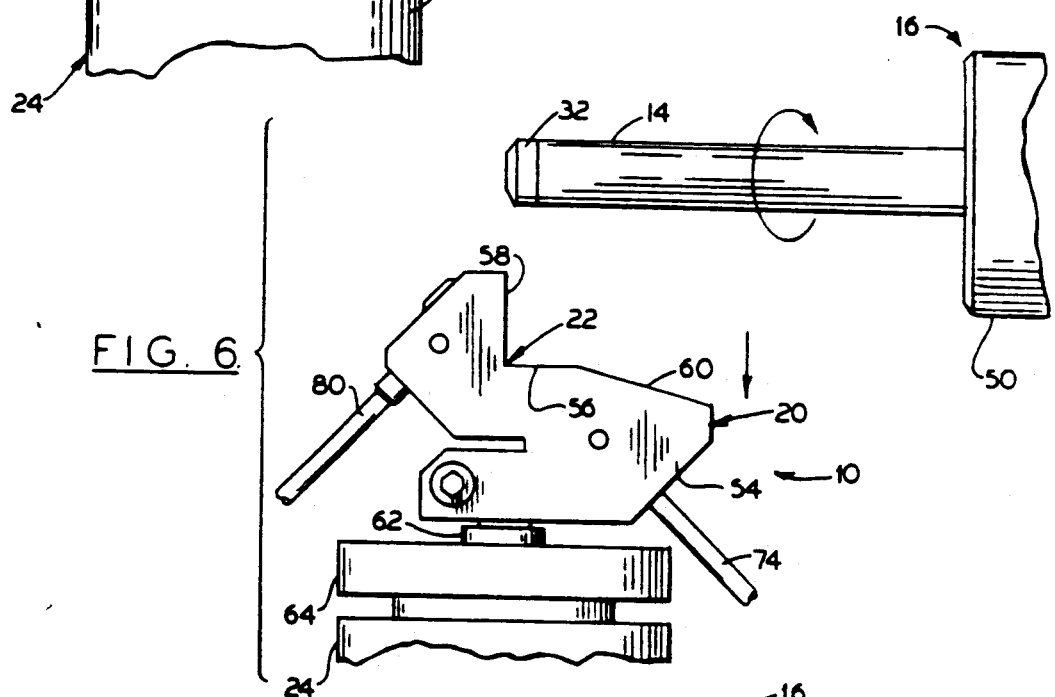
FIG. 6 is a schematic elevation view showing the rod stop member lowered out of the rod working position for ultrasonic testing.
Figure 7:
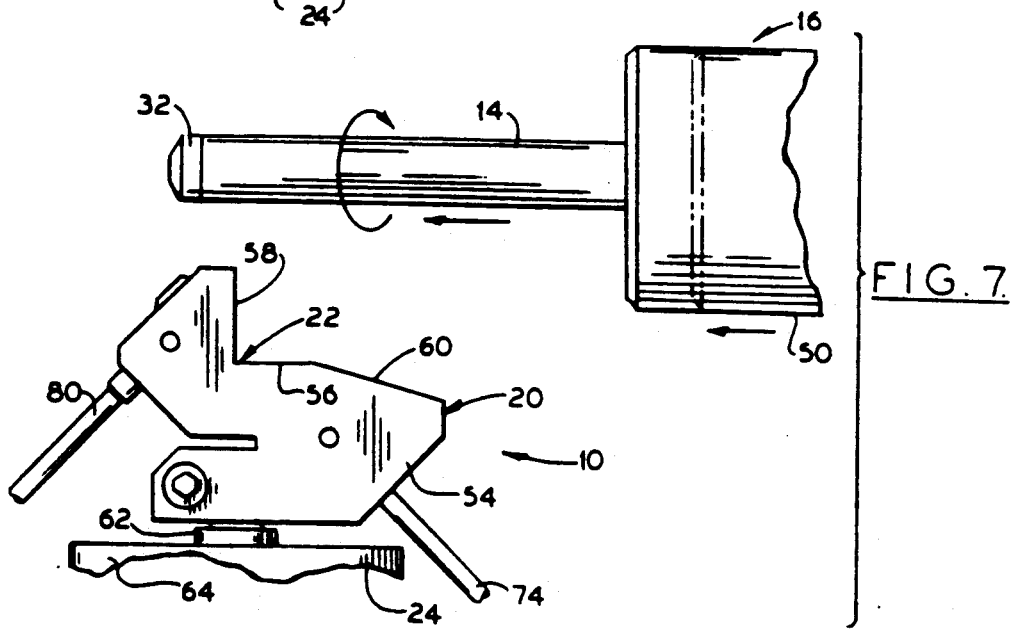
FIG. 7 is a side elevation view showing the fuel rod advancing for ultrasonic testing.

The rod advancing and securing means 16 for advancing the rod into the rod testing position and securing the rod end to the fixed position when the rod end has advanced into the rod testing position includes a conventional drive chuck assembly 50 mounted into an access opening of the water tank end wall. The drive chuck assembly 50 is sealed for preventing water from leaking around the access opening. The drive chuck assembly includes an opening for receiving a fuel rod and a seal for preventing leakage of water past the fuel rod. Any number of conventional drive chuck assemblies can be used. Some have separate advancing rails 52 for engaging the fuel rod and advancing the fuel rod into the water tank. Other drive chuck assemblies include an integral or separate advancing mechanism for engaging and advancing a fuel rod. The drive chuck assembly so secures the fuel rod into a fixed position after the fuel rod has advanced into a rod testing position (FIG. 5). Conventional locking grippers, illustrated schematically at 51, or other means are used for securing the rod in a fixed position. The drive chuck assembly 50 also is longitudinally movable relative to the rod stop member 20 for advancing the fuel rod a predetermined amount after ultrasonically testing the seal weld (FIGS. 6 and 7). Positioning of the fuel rod is more critical when ultrasonically testing the fuel rod than is the testing of the girth weld. Typically, the seal weld is no more than 0.015 inches deep. Thus, precise positioning is important. After seal weld testing, the rod can be longitudinally advanced and the rod ultrasonically tested. As the rod is advanced, it is rotated and as the rod advances, the sound waves engage the girth weld as the girth weld enters the rod testing position. For allowing rotation of the fuel rod and complete ultrasonic testing of the periphery of the fuel rod, the drive chuck assembly so is rotatable on bearings (not shown).

As shown in FIG. 1, the rod stop member 20 is positioned in the water tank 12 and receives the end of a rod advanced into the rod testing position. In accordance with the present invention, the rod stop member is constructed to allow repetitive positioning of fuel rods to within values as low as 0.001 inch for assuring that successive rods inserted into the water tank for ultrasonic testing are properly positioned. As illustrated, the rod stop member 20 includes a vertically oriented, L-shaped plate member 54 having a substantially horizontal top surface 56 on the rod stop member 20 for engaging the fuel rod end as it is advanced into the rod testing position. A vertical support surface plate member 58 is positioned adjacent to the top surface 56 and forms the upper leg of the L-shaped plate member 54. The substantially horizontal top surface 56 includes an inclined concave groove 60 for engaging a misaligned fuel rod end and for guiding the fuel rod end into alignment with the rod stop position 22 as the fuel rod is advanced (FIG. 2A). At times, a fuel rod 14 is misoriented as it is fed through the drive chuck assembly 50. In these instances Where the advancing fuel rod 14 is misaligned, the drive chuck assembly 50 could secure the fuel rod in fixed, misoriented position and cause erroneous test results. Accordingly, the inclined concave groove 60 directs misaligned fuel rods end into a proper position for ultrasonic testing.

The rod support member 20 is mounted advantageously on the output shaft 62 of a pneumatic cylinder 64 as shown in FIG. 1. The pneumatic cylinder 64 allows the rod stop member 20 to move between a first position where the pneumatic cylinder output shaft 62 is extended and the rod support member 20 is positioned for receiving a rod into the testing position and a second position where the rod stop member 20 is positioned out of the testing position for allowing ultrasonic testing of the fuel rod. When the pneumatic cylinder output shaft 62 is lowered, the rod stop member 20 is moved into a second position out of the rod testing position for allowing ultrasonic testing of the fuel rod. Alternatively, the rod stop member 20 could be supported on a housing member or other support means and other drive means such as rack and pinion systems, mechanical and electromechanical systems, or digitally controlled actuators could be used for moving the rod stop member between first and second positions. In the illustrated embodiment, the pneumatic cylinder 64 is supported on a base plate 66 which is fixed to the bottom of the water tank 12. The pneumatic cylinder 64 extends through the bottom portion of the base plate 66 and is secured onto a support assembly 66. The support assembly 68 is fixed to the underside of the bottom wall and engages the pneumatic cylinder 64 to aid in supporting the pneumatic cylinder onto the bottom wall of the water tank.

As illustrated in FIG. 1, the light emittance means 16 emits light across the area a rod end occupies when positioned in the testing position. The light sensor means 28 receives the light emitted across the testing position. The rod emittance means includes a light emitting diode 70 positioned in a sealed control housing 72 positioned under the bottom wall of the water tank. A first fiber optic cable 74 has one end connected to the light emitting diode 70 and receives the emitted light from the diode. The other end of the fiber optic cable 74 is supported by a cable mount 76 on the rod stop member 20 adjacent the testing position and emits light across the testing position.

As illustrated, the fiber optic cable end is positioned on the substantially horizontal top surface 56 and is oriented so that the majority of the light emitted from the end of the fiber optic cable passes upward onto the vertical support plate member 58. The end of the fiber optic cable is received in a small recess (not shown) on the top surface 56 so that the end of the fuel rod does not engage the fiber optic cable end as the fuel rod moves into the inclined concave groove 60. The light emitted from the end of the fiber optic cable is directed across the area a rod end occupies when positioned in the rod stop position.

A light detecting diode 78 is positioned in the control housing 80 and includes a second fiber optic cable 80 having one end connected to the light detecting diode and the other end supported by a cable mount on the vertical support plate member 58 adjacent the testing position and opposite the fiber optic cable end emitting the light.

As fuel rod 14 is advanced into the testing position, the rod blocks the light emitted onto the end of the second fiber optic cable 80 connected to the light detecting diode 78. The two fiber optic cables form a circuit which when broken activates the control means 30 in the form of a conventional controller operatively connected to the pneumatic cylinder 64, the light detecting diode 78 and the drive chuck assembly 50. The controller 30 can be any of a large number of solid state or other control mechanisms. As a fuel rod 14 is advanced into the testing position, the fuel rod blocks light emitted from the light emitting diode 70 onto the light detecting diode 78. The controller is responsive to the light detecting diode 78 so that when the light detecting diode is not generating current, i.e. when light is not received, the controller activates the drive chuck assembly 50 and stops further advancement of the rod. The rod is secured in a fixed position. Additionally, the controller actuates the pneumatic cylinder 64 to lower the output shaft and the rod stop member out of the rod testing position to allow ultrasonic testing.

The use of fiber optic cables, light emitting diodes and light detecting diodes is advantageous for use in the present invention. The fiber optic cables can be formed from either plastic or glass. As is conventional, the cable includes a protective coating. The fiber optic cable is impervious to water and thus will not suffer the drawback of electrical contact systems where the electrical wire leads and the electrical contact sensor may fail in a water environment.

A light emitting diode is more advantageous for use in the present invention than a laser source because a light emitting diode is inexpensive and does not demand temperature stabilizing. The light emitting diode emits light as a result of the recombining of electrons and holes, i.e. it is semiconductor device. Typically, the light emitting diode is a PN junction diode. When it is forward-biased, the minority carriers are injected across the junction, and when they cross, they combine with the majority carriers and give up energy. The energy released is about equal to the material's energy gap. Gallium arsenide (GaAs) light emitting diodes have been found suitable for use in the present invention.

The light detecting diode converts the transmitted light back into the electric energy. The light detecting diode can be a PIN or avalanche photo diode. When the PN junction is in the dark and reverse-biased there is little current flow through it. When light shines on the surface, the photo energy of the light becomes absorbed and this causes hole-electron pairs to be created. When the carriers are created in or near the junction depletion region, they move across the junction and create a current flow in the circuitry external to the diode.

METHOD OF OPERATION

In accordance with the illustrated embodiment of the present invention, the end of a fuel rod 14 is advanced into the drive chuck assembly 50 and then advanced into the water tank 12. The fuel rod 14 engages the rod stop member inclined concave groove 60 and advances into the testing position where the rod blocks light emitted from the first fiber optic cable 74 onto the second fiber optic cable 80. As the light is blocked, the controller 30 which is receptive to the light detecting diode 78, activates the drive chuck assembly 50 stopping further advancement of the fuel rod and securing (i.e. "locking") the fuel rod in a fixed position so that the end of the fuel rod is positioned in the rod testing position. Additionally, the controller 30 activates the pneumatic 64 cylinder and lowers the pneumatic cylinder out of the rod testing position to allow ultrasonic testing.

Ultrasonic testing begins and the drive chuck assembly 50 is advanced and rotated. The seal and girth welds are tested concurrently as the fuel rod is rotated and axially moved within the test tank. The total advancement of the drive chuck assembly is determined by the length of the sealing plug and fuel tube junction having the girth weld circumferentially positioned thereon. After ultrasonic testing of the girth weld, the fuel rod 14 is removed and replaced by a another rod.

The present invention offers several benefits over other prior art rod positioning apparatus and ultrasonic testing apparatus used for the ultrasonic testing of the end of nuclear fuel rods. Other prior art apparatus used electrical contact sensors positioned on submerged rod stop members for engaging the end of the fuel rod as it is advanced into a rod stop position. The electrical contact sensors are not reliable in submerged water environments. Fiber optic cables, on the other hand, are reliable in submerged water environments. Additionally, there are no electrical wire leads extending through the water which can corrode and cause electrical shorts.

In the drawings and specification, there have been disclosed typical preferred embodiments of the invention and, although specific terms are employed, they are used in the generic and descriptive sense only, and not for purposes of limitation. It will thus be recognized that numerous variations can be made within the spirit and scope of the invention as described in the foregoing specification and defined in the following claims.

What is claimed is:

1. An apparatus for ultrasonically testing the end of a rod comprising
    means for axially advancing a rod along a path of travel toward a testing position, said advancing means including rod securing means for selectively securing the rod in a fixed position when the end of the rod is advanced to said testing position,
    ultrasonic transducer means positioned at said testing position for ultrasonically testing a rod end when the rod end is positioned at the testing position,
    a rod stop member including means defining said testing position, said rod stop member being movable between a first position where the rod stop member is positioned along said path of travel and a second position where the rod stop member is withdrawn from said path of travel for allowing testing of the end of a rod, said means defining said testing position comprising light emittance means for emitting light across the area a rod end occupies when positioned in said testing position, and light sensor means for receiving light emitted from the light emittance means, control means operatively connected to said rod advancing and securing means and said light sensor means and being responsive to said light sensor means when light is not sensed and controlling said rod advancing and securing means for stopping further advancement of said rod and securing said rod in a fixed position when said rod end has advanced into said rod testing position and blocked the light emitted from the light emittance means onto said light sensor means, and drive means connected to said rod stop member for selectively moving said rod stop member between said first and second position so as to permit the ultrasonic testing of the rod end when the rod end is at said testing position without interference from the rod stop member.

2. An ultrasonic testing apparatus as claimed in claim 1 wherein said rod stop member further comprises a substantially horizontal top surface for engaging the rod as it is advanced axially toward said testing position, said top surface including an inclined concave groove for engaging a misaligned rod end and for guiding the rod end into a predetermined axial alignment.

3. An ultrasonic testing apparatus as claimed in claim 1 further including a water tank, said rod stop member being positioned in said water tank.

4. An ultrasonic testing apparatus as claimed in claim 1 wherein said light emittance means comprises a light emitting diode and a fiber optic cable having one end connected to said light emitting diode for receiving emitted light from the diode and the other end supported by said rod stop member adjacent said testing position an being positioned for emitting light across the area a rod end occupies when positioned in said testing position.

5. An ultrasonic testing apparatus in claim 4 wherein said light sensor means comprises a light detecting diode and a fiber optic cable having one end connected to said light detecting diode and the other end supported by said rod stop member adjacent said testing position for receiving light emitted from said light emittance means.

* * * * *